(No Model.)

A. HAUTSCH.
PAN LIFTER.

No. 602,324. Patented Apr. 12, 1898.

WITNESSES

INVENTOR
ANTON HAUTSCH.
By John Wedderburn
Attorney

UNITED STATES PATENT OFFICE.

ANTON HAUTSCH, OF NYACK, NEW YORK.

PAN-LIFTER.

SPECIFICATION forming part of Letters Patent No. 602,324, dated April 12, 1898.

Application filed February 27, 1897. Serial No. 625,305. (No model.)

*To all whom it may concern:*

Be it known that I, ANTON HAUTSCH, a citizen of the United States, residing at Nyack, in the county of Rockland and State of New York, have invented certain new and useful Improvements in Pan-Lifters; and I do hereby declare the following to be a full, clear, and exact description of the invention, such as will enable others skilled in the art to which it appertains to make and use the same.

This invention relates to improvements in implements for lifting baking-pans and similar cooking utensils, the object of the same being to provide a handle the inner end of which is formed with notches or recesses of peculiar shape to engage corresponding projections formed on the said baking-pan or cooking utensil.

With the above objects in view the invention consists in the particular construction and combination of parts, as will be hereinafter fully set forth, and specifically pointed out in the claim.

Figure 1:
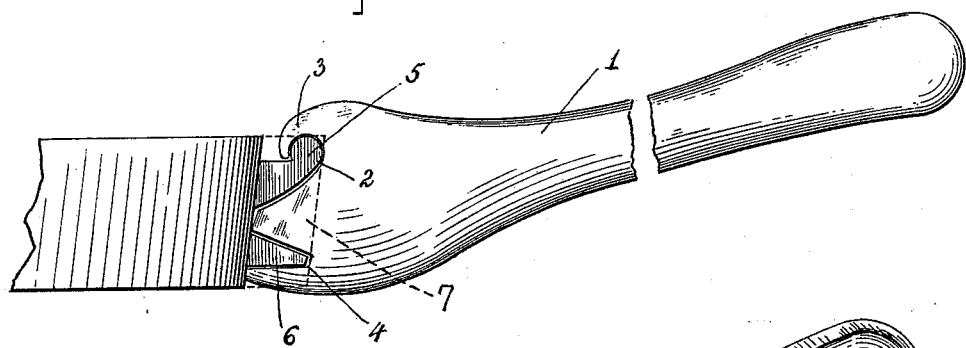
Figure 2:
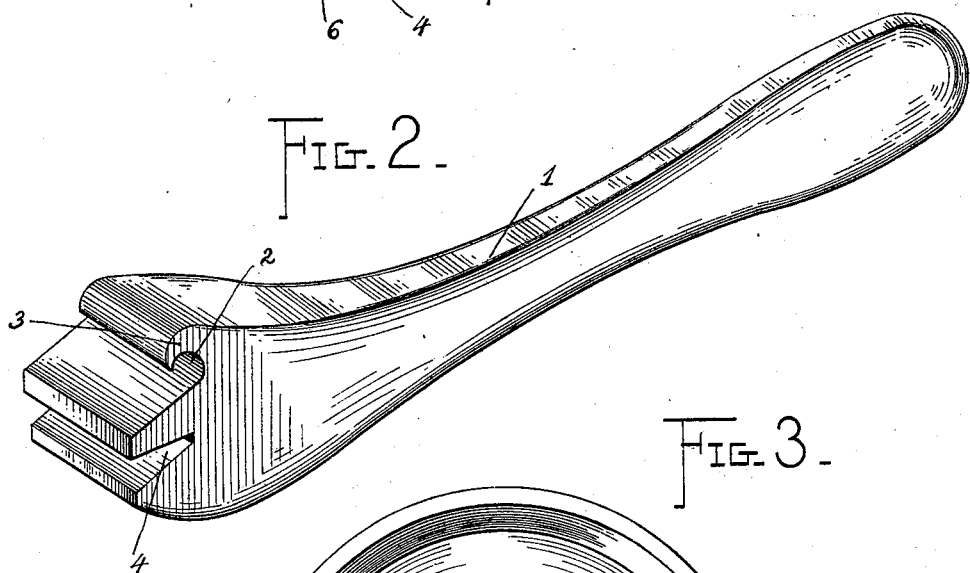
Figure 3:
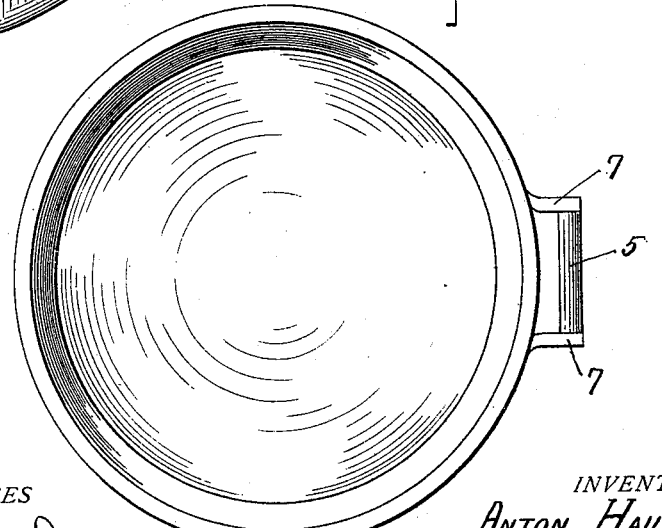

In the accompanying drawings, forming part of this specification, Figure 1 is a side elevation showing the application of my invention. Fig. 2 is a perspective view of the handle or implement, and Fig. 3 is a plan view of the pan or cooking utensil.

In the drawings the numeral 1 designates the implement or handling-iron, the outer end of which is formed into a convenient grasping portion, while the inner end is enlarged and provided with a recess 2, which is curved upward, as shown, to form the hook 3. At the lower part of the inner end of the handle is a V-shaped recess 4, giving to said lower part the bifurcated form shown.

In connection with an implement presenting the hook 3 and recess 4, hereinbefore described, the baking-pan or other cooking utensil is formed with projections to correspond with the said parts or recesses in the handle. The upper member 5 of the pan presents a hooked or curved portion which engages the recess 2 in the handle and is engaged by the hook, while the projection 6 of the pan enters the corresponding recess in the handle to prevent independent vertical movement of the said handle when it is in engagement with the said projecting parts. In order to prevent lateral movement of the handle upon the projections of the pan, the said projections are provided at each side with connecting plates or strips 7, these plates permitting the implement to be manipulated to turn the pan.

From the foregoing description it will be seen that I have provided an implement or handling-iron which when used in connection with certain projections formed on the cooking utensil will permit of the latter being safely handled without having it encumbered by a rigid handle. The particular construction of the parts also provides a connection by which the pan can be turned by resting the rear end of the same upon a table or support, so that the bearing between the parts will insure the proper engagement of the hook.

By the construction described the lifter is made to substantially fill in between the side strips or plates 7, which serve to prevent lateral movement of the iron, and by reason of the depth of bearing of the iron, which is given by the downward and inward extension of the bifurcated portion thereof, it is made to snugly grasp the V-shaped projection on the pan. A substantially rigid connection of the handle with the utensil is made when the handle is properly in place, and this connection is such as to enable the handle to be turned for pouring out the contents of the vessel without disturbing the connection of the handle with the vessel.

Having thus described my invention, what I claim as new, and desire to secure by Letters Patent, is—

A cooking utensil or vessel provided with a radially-extending projection 5 terminating in a raised and substantially cylindrical cross-bar end and having its lower face inclined, and a V-shaped projection 6 below the first-named projection and having its upper face inclined and the lower face substantially horizontal, the said upper projection extending slightly beyond the lower projection and being connected therewith by vertical side plates, in combination with a handling-iron provided with an enlarged end having a downturned hook at its upper edge designed to engage the cylindrical end of the upper projection on the vessel, and a projection below the hook and extending beyond the same, said lower projection being bifurcated, or provided with a V-shaped recess adapting it to snugly grasp the lower projection on the vessel and to rest against said vessel at its end, all substantially as described.

In testimony whereof I have signed this specification in the presence of two subscribing witnesses.

ANTON HAUTSCH.

Witnesses:
WM. S. GREEN,
WILLIAM L. PATON.